(12) United States Patent
Sawafta et al.

(10) Patent No.: US 9,896,809 B2
(45) Date of Patent: Feb. 20, 2018

(54) ARTIFICIAL TURF SYSTEMS AND APPLICATIONS THEREOF

(76) Inventors: Reyad I. Sawafta, Greensboro, NC (US); Jeffrey W. Bruner, Greensboro, NC (US)

( * ) Notice: Subject to any disclaimer, the term of this patent is extended or adjusted under 35 U.S.C. 154(b) by 0 days.

(21) Appl. No.: 13/879,514

(22) PCT Filed: Oct. 28, 2011

(86) PCT No.: PCT/US2011/058311
§ 371 (c)(1),
(2), (4) Date: Apr. 15, 2013

(87) PCT Pub. No.: WO2012/058555
PCT Pub. Date: May 3, 2012

(65) Prior Publication Data
US 2013/0199755 A1  Aug. 8, 2013

Related U.S. Application Data

(60) Provisional application No. 61/408,208, filed on Oct. 29, 2010.

(51) Int. Cl.
*E01C 13/08* (2006.01)
*D05C 15/08* (2006.01)
*F28D 20/00* (2006.01)

(52) U.S. Cl.
CPC ............ *E01C 13/083* (2013.01); *D05C 15/08* (2013.01); *E01C 13/08* (2013.01); *F28D 20/00* (2013.01)

(58) Field of Classification Search
CPC ....... E01C 13/08; E01C 13/083; D05C 15/08; F28D 20/00

USPC .......................................... 428/17
See application file for complete search history.

(56) References Cited

U.S. PATENT DOCUMENTS

2006/0254088 A1* 11/2006 McCormick ............... 36/44
2008/0260975 A1   10/2008 Morton-Finger
2008/0317978 A1   12/2008 Smit et al.
(Continued)

FOREIGN PATENT DOCUMENTS

| JP | 2004316244 A | * 11/2004 |
| KR | 100919458 B1 | 9/2009 |
| KR | 201000026957 A | 3/2010 |

OTHER PUBLICATIONS

Computerized English translation of JP 2004-316244 A to Ishiguro, which published on Nov. 11, 2004, obtained from European Patent Office website.*

(Continued)

*Primary Examiner* — Jeremy R Pierce
(74) *Attorney, Agent, or Firm* — John P. Zimmer; Smith Moore Leatherwood LLP (57) ABSTRACT

In one aspect, artificial turf systems are described herein. In some embodiments, an artificial turf system comprises an artificial turf mat and artificial turf fibers disposed on a surface of the artificial turf mat, the artificial turf mat comprising at least one energy management material. An energy management material, in some embodiments, is disposed in a backing of the artificial turf mat, a binding agent of the artificial turf mat, and/or an infill material of the artificial turf mat. In addition, in some embodiments, the artificial turf fibers also comprise at least one energy management material.

9 Claims, 2 Drawing Sheets

(56) References Cited

U.S. PATENT DOCUMENTS

| | | | |
|---|---|---|---|
| 2009/0035488 A1* | 2/2009 | Astenius | A41G 1/006 428/17 |
| 2009/0278074 A1* | 11/2009 | Cox et al. | 252/67 |
| 2009/0286018 A1 | 11/2009 | Takashi et al. | |
| 2010/0086708 A1* | 4/2010 | Jenkines | D06N 3/0043 428/17 |
| 2010/0203265 A1* | 8/2010 | Tetrault et al. | 428/17 |
| 2011/0091663 A1* | 4/2011 | Olde Weghuis et al. | 428/17 |

OTHER PUBLICATIONS

International Search Report of PCT/US2011/058311 dated May 11, 2012, 2 pgs.

* cited by examiner

ARTIFICIAL TURF SYSTEMS AND APPLICATIONS THEREOF

CROSS-REFERENCE TO RELATED APPLICATIONS

This application is a national stage application under 35 U.S.C. 371 of International Application No. PCT/US2011/058311 filed 28 Oct. 2011, which claims priority pursuant to 35 U.S.C. § 119(e) to U.S. Provisional Patent Application Ser. No. 61/408,208, filed on Oct. 29, 2010, which are each hereby incorporated by reference in their entireties.

FIELD

The present invention relates to artificial turf and, in particular, to artificial turf systems and applications thereof.

BACKGROUND

Traditionally, athletic fields and other landscaped areas of private and public properties are covered with a natural grass covering. Recently, however, many athletic fields have been converted from natural grass to artificial grass coverings. Some artificial grass coverings can be less expensive and less time-consuming to maintain compared to natural grass coverings. In addition, natural grass coverings can be difficult to grow in some natural and man-made environments, such as desert regions, spaces shaded by buildings, domed fields, and high traffic areas. Moreover, in areas where natural grass is unable to grow properly or adequately, injuries can result from inadequate footing and/or covering on such ailing natural grass. In addition, ailing natural grass coverings are typically unsightly.

Some artificial grass coverings have improved over the years in that such coverings appear more like natural grass coverings. Other improvements to artificial grass coverings have been made to give more cushioning and elasticity to such coverings, thus giving such coverings nearly the same advantages as natural grass coverings. However, some disadvantages of artificial grass coverings remain In particular, most artificial grass coverings are comprised primarily of plastics, such as, for example, polyethylene. Such plastics tend to absorb, retain, and then release thermal energy, heating their environments and increasing the temperature of the air above the artificial grass covering and the artificial grass covering itself As a result, temperatures on some artificial grass coverings can reach potentially fatal levels. Artificial grass coverings can also contribute to heat-related injuries such as heat cramps, heat exhaustion, and heat stroke.

Attempts have been made to decrease the temperature of artificial grass coverings, including by watering the artificial coverings. However, water quickly evaporates. Other attempts have used a series of cooling pipes placed under the artificial grass coverings. However, such systems are expensive, and their installation requires the removal of existing artificial grass coverings as well as excavation and replacement of the foundation for such existing coverings.

SUMMARY

In one aspect, artificial turf systems are described herein. In some embodiments, an artificial turf system comprises an artificial turf mat and artificial turf fibers disposed on a surface of the artificial turf mat, the artificial turf mat comprising at least one energy management material. An energy management material, in some embodiments, is disposed in a backing of the artificial turf mat, a binding agent of the artificial turf mat, and/or an infill material of the artificial turf mat. Moreover, in some embodiments, an energy management material is present in the backing in an amount up to about 50 weight percent. Further, in some embodiments, an energy management material is present in the infill material in an amount up to about 90 weight percent.

In addition, in some embodiments of artificial turf systems described herein, the artificial turf fibers also comprise at least one energy management material. For example, in some embodiments, the artificial turf mat comprises at least one first energy management material and the artificial turf fibers comprise at least one second energy management material. The at least one second energy management material, in some embodiments, is disposed on a surface of the artificial turf fibers. In some embodiments, the at least one second energy management material is disposed in the interior of the artificial turf fibers.

An energy management material described herein can comprise an energy reflecting material, an energy absorbing material, and/or a thermal insulation material. In some embodiments, an energy reflecting material is operable to reflect electromagnetic radiation, such as infrared (IR) radiation. In some embodiments, an energy reflecting material comprises a zeolite. Further, in some embodiments, an energy absorbing material comprises a phase change material (PCM) and/or a zeolite. In addition, in some embodiments, a thermal insulation material comprises an aerogel.

In another aspect, methods of maintaining the temperature of an artificial turf environment are described herein. In some embodiments, a method of maintaining the temperature of an artificial turf environment comprises providing an artificial turf system comprising an artificial turf mat and artificial turf fibers disposed on a surface of the artificial turf mat, the artificial turf mat comprising at least one energy management material. In some embodiments, the artificial turf fibers also comprise at least one energy management material. For example, in some embodiments, the artificial turf mat comprises at least one first energy management material and the artificial turf fibers comprise at least one second energy management material.

In some embodiments of methods of maintaining the temperature of an artificial turf environment described herein, maintaining the temperature of an artificial turf environment comprises maintaining the temperature of the air immediately above the artificial turf system within about ±10° C. of the ambient temperature. In some embodiments, maintaining the temperature of the artificial turf environment comprises maintaining the temperature of the surface of the artificial turf mat within about ±10° C. of the ambient temperature. The ambient temperature, in some embodiments, is greater than about 30° C. Alternatively, in some embodiments, maintaining the temperature of the artificial turf environment comprises maintaining the temperature of the surface of the artificial turf mat below about 40° C.

In another aspect, methods of making an artificial turf system are described herein. In some embodiments, a method of making an artificial turf system comprises providing an artificial turf mat and disposing artificial turf fibers on a surface of the artificial turf mat, the artificial turf mat comprising at least one energy management material. In some embodiments, the artificial turf fibers also comprise at least one energy management material. For example, in some embodiments, the artificial turf mat comprises at least one first energy management material and the artificial turf fibers comprise at least one second energy management material.

These and other embodiments are described in greater detail in the detailed description which follows.

DETAILED DESCRIPTION

Embodiments described herein can be understood more readily by reference to the following detailed description, examples, and drawings. Elements, apparatus, and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

I. Artificial Turf Systems

In one aspect, artificial turf systems are described herein. In some embodiments, an artificial turf system comprises an artificial turf mat and artificial turf fibers disposed on a surface of the artificial turf mat, the artificial turf mat comprising at least one energy management material. In addition, in some embodiments, the artificial turf fibers also comprise at least one energy management material. For example, in some embodiments, the artificial turf mat comprises at least one first energy management material and the artificial turf fibers comprise at least one second energy management material.

Moreover, an artificial turf mat of an artificial turf system described herein, in some embodiments, can comprise various components in addition to at least one energy management material. In some embodiments, for example, an artificial turf mat comprises a backing, a binding agent, a fabric and/or an infill material. These components can be arranged in various ways. For instance, in some embodiments, an artificial turf mat comprises a backing, a fabric disposed on the backing, and a binding agent disposed between the fabric and the backing. In some embodiments, an artificial turf mat further comprises an infill material disposed on the fabric. In some embodiments, the infill material is disposed in the interstices of the artificial turf fibers disposed on the surface of the artificial turf mat. Further, in some embodiments, the at least one energy management material is disposed in one or more of these additional components of the artificial turf mat. For example, in some embodiments, at least one energy management material is disposed in a backing of the artificial turf mat. In other embodiments, at least one energy management material is disposed in a binding agent of the artificial turf mat. In some embodiments, at least one energy management material is disposed in an infill material of the artificial turf mat.

In addition, in some embodiments, an artificial turf system described herein further comprises one or more drainage layers.

Figure 1:
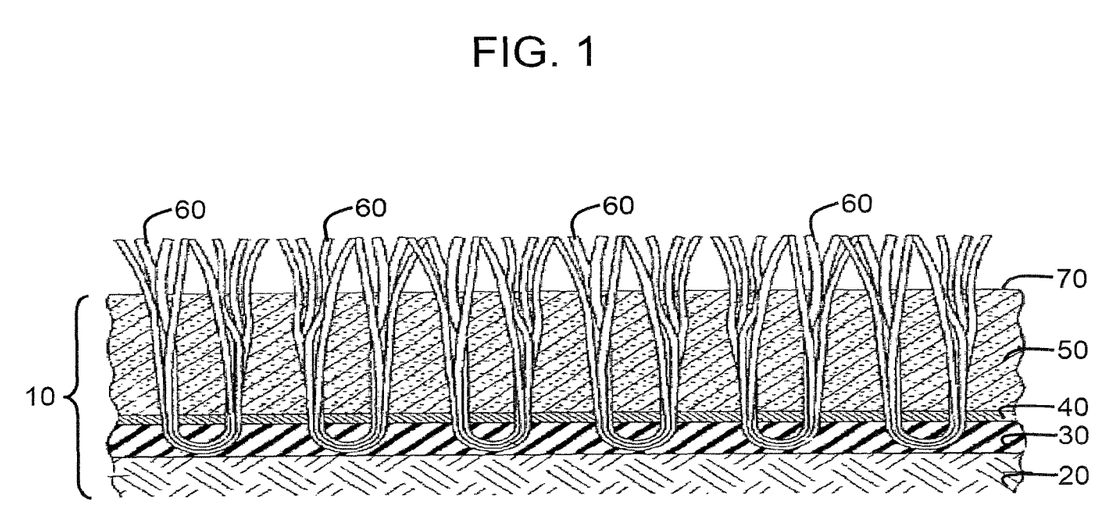
FIG. 1 illustrates a cross-sectional view of an artificial turf system according to one embodiment described herein.

FIG. 1 illustrates a cross-sectional view of an artificial turf system according to one embodiment described herein. In the embodiment of FIG. 1, artificial turf mat (10) comprises a backing (20), a binding agent (30), a fabric (40) and an infill material (50). Artificial turf fibers (60) are disposed on a surface (70) of the mat (10). Further, in the embodiment of FIG. 1, fibers (60) are woven through the mat (10). One or more of backing (20), binding agent (30), and infill material (50) can comprise at least one energy management material (not shown). In addition, in some embodiments, artificial turf mat (10) can be disposed on one or more drainage layers (not shown). Further, artificial turf mat (10), artificial turf fibers (60), and one or more drainage layers, if present, can be disposed on the ground or another installation surface to provide an artificial grass covering.

Figure 2:
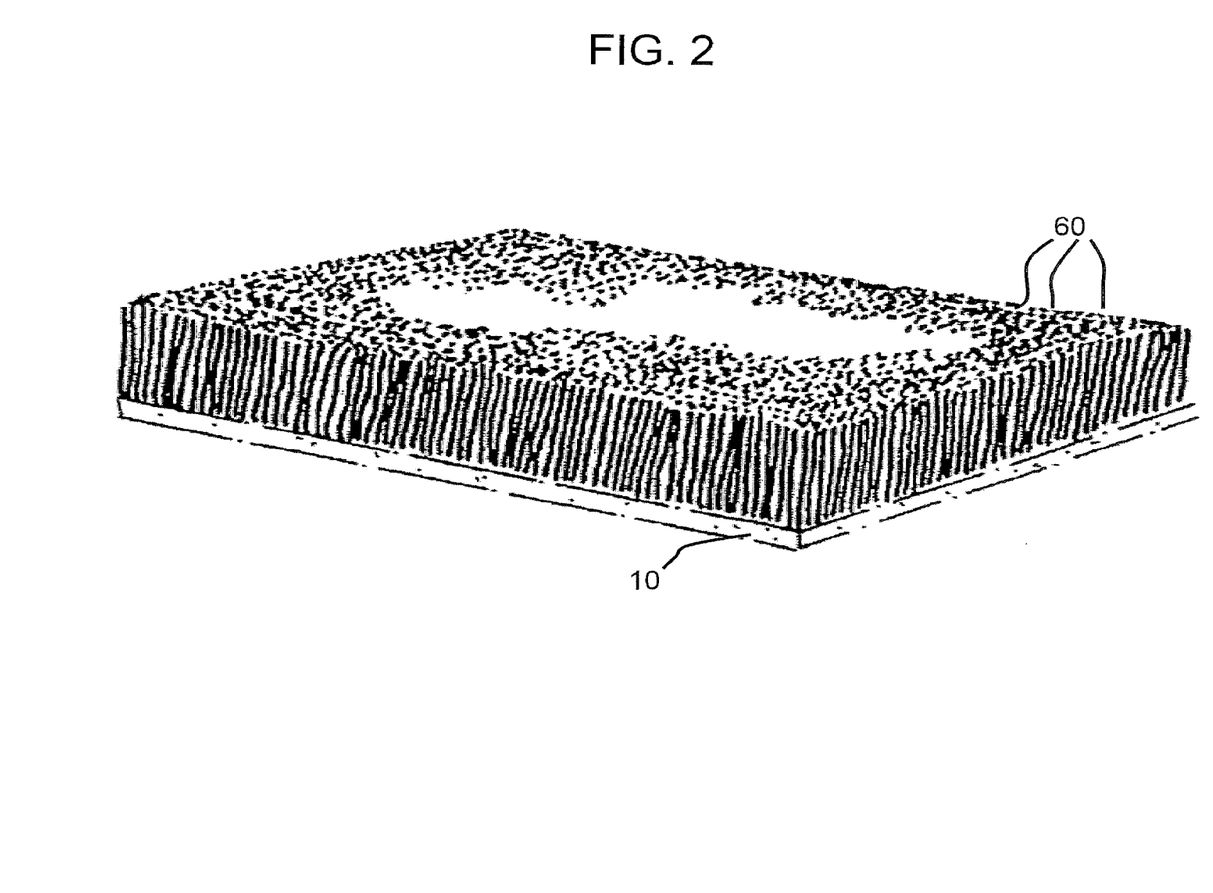
FIG. 2 illustrates a perspective view of the artificial turf system of FIG. 1.

FIG. 2 illustrates a perspective view of the artificial turf system of FIG. 1. Artificial turf fibers (60) are disposed on a surface of artificial turf mat (10, with infill material 50 not shown).

A. Artificial Turf Mats

Turning now to components of artificial turf systems described herein, artificial turf systems described herein comprise an artificial turf mat. Further, in some embodiments, an artificial turf mat comprises a backing, binding agent, fabric, and/or infill material.

1. Backings

A backing of an artificial turf mat described herein can have any size and shape not inconsistent with the objectives of the present invention. In some embodiments, for example, a backing has a size suitable for use in commercial applications, including athletic field covering applications. In some embodiments, a backing described herein comprises a sheet. The sheet can have any thickness not inconsistent with the objectives of the present invention. In some embodiments, for example, the sheet has a thickness ranging from about 0.5 cm to about 2.5 cm. Further, in some embodiments, the sheet has a length ranging from about 0.5 m to about 10 m in at least one dimension, Moreover, a backing of an artificial turf mat described herein can have any composition not inconsistent with the objectives of the present invention. In some embodiments, for example, a backing comprises a foam. In some embodiments, a backing comprises urethane. In some embodiments, a backing comprises a polymeric material. Any polymeric material not inconsistent with the objectives of the present invention may be used.

In addition, a backing of an artificial turf mat described herein can have any mechanical properties not inconsistent with the objectives of the present invention. In some embodiments, for instance, a backing has sufficient strength, tear resistance, and/or elasticity to be used in athletic field covering applications. Moreover, the size, shape, and/or composition of a backing of an artificial turf mat described herein, in some embodiments, is selected based on one or more desired physical properties of the mat, including, for example, tear strength, weather resistance (e.g., resistance to shrinkage/growth when subjected to normal climatic weather and temperature change), abrasive wear resistance, dimensional stability (e.g., stability when subjected to physical force during installation and normal use), elasticity, and/or shock absorbency.

As described herein, in some embodiments, at least one energy management material is disposed in a backing of an artificial turf mat. An energy management material can be disposed in any portion of a backing not inconsistent with the objectives of the present invention. In some embodiments, for example, an energy management material is disposed on a surface of the backing. In some embodiments, an energy management material is disposed as a coating, such as a laminate coating. In some embodiments, one or both sides of a backing sheet is coated with an energy management material. In other embodiments, an energy management material is embedded within the backing. In some embodiments, for example, an energy management material is dispersed uniformly or substantially uniformly in the backing.

Moreover, an energy management material can be disposed in a backing using any method not inconsistent with the objectives of the present invention. For example, in some embodiments, an energy management material is sprayed or rolled onto a surface of the backing. In other embodiments, an energy management material is mixed with other starting materials of the backing during manufacture of the backing. In such embodiments, for instance, one or more energy management materials are co-processed with other starting materials to form a backing comprising one or more energy management materials uniformly dispersed in the backing.

Further, in some embodiments comprising at least one energy management material disposed in a backing of an artificial turf mat described herein, the energy management material can be present in any amount not inconsistent with the objectives of the present invention. In some embodiments, the energy management material is present in the backing in an amount up to about 50 weight percent. In some embodiments, the energy management material is present in the backing in an amount up to about 30 weight percent. In some embodiments, the energy management material is present in the backing in an amount between about 1 weight percent and about 30 weight percent, between about 10 weight percent and about 30 weight percent, or between about 15 weight percent and about 30 weight percent. In some embodiments, the energy management material is present in the backing in an amount between about 1 weight percent and about 50 weight percent, between about 15 weight percent and about 50 weight percent, or between about 30 weight percent and about 50 weight percent.

Moreover, in some embodiments, the presence of an energy management material in the backing does not substantially diminish the mechanical properties of the backing. In some embodiments, for example, an energy management material is present in the backing in an amount up to about 50 weight percent and the backing has sufficient tear strength, weather resistance, abrasive wear resistance, dimensional stability, elasticity, and/or shock absorbency to be used in athletic field covering applications.

2. Fabrics

As described herein, in some embodiments, an artificial turf mat comprises a fabric. The fabric, in some embodiments, is disposed on a backing of the artificial turf mat. Any fabric not inconsistent with the objectives of the present invention may be used. In some embodiments, for example, a fabric comprises a geotextile fabric. In some embodiments, a fabric comprises a layered fabric. A layered fabric, in some embodiments, can comprise one or more layers of nonwoven fabric, woven fabric, or a combination of both nonwoven and woven fabric. Further, in some embodiments, a fabric comprises fibers comprising one or more of polypropylene, polyester, and glass. A fabric of an artificial turf mat described herein, in some embodiments, is selected based on one or more desired physical properties of the mat, including, for example, tear strength, weather resistance, abrasive wear resistance, dimensional stability, and/or elasticity. In addition, in some embodiments, a fabric comprises an energy management material. An energy management material can be disposed in any portion of a fabric in any manner not inconsistent with the objectives of the present invention.

3. Binding Agents

As described herein, in some embodiments, an artificial turf mat comprises a binding agent. The binding agent, in some embodiments, is disposed between a backing and a fabric of the artificial turf mat. Any binding agent not inconsistent with the objectives of the present invention may be used. In some embodiments, the binding agent comprises one or more of epoxy, polyurethane, latex, acrylic, or a thermoplastic hot melt or combinations thereof A binding agent, in some embodiments, further comprises one or more additives or fillers. Non-limiting examples of additives or fillers suitable for use in some embodiments described herein include calcium carbonate, coal fly ash, fumed silica, water, foaming compounds, and anti-foaming compounds.

Further, in some embodiments, at least one energy management material is disposed in a binding agent of the artificial turf mat. An energy management material can be disposed in a binding agent in any manner not inconsistent with the objectives of the present invention. In some embodiments, for example, an energy management material is dispersed uniformly or substantially uniformly in the binding agent. Such embodiments can be made, for instance, by mixing one or more energy management materials with one or more other components of a binding agent described herein. Moreover, an energy management material can be present in a binding agent in any amount not inconsistent with the objectives of the present invention.

4. Infill Materials

As described herein, in some embodiments, an artificial turf mat comprises an infill material. Any infill material not inconsistent with the objectives of the present invention may be used. In some embodiments, an infill material comprises particles such as granules or beads, including loose granules or beads. The granules or beads can have any size and/or shape not inconsistent with the objectives of the present invention. In some embodiments, for example, the granules or beads have a diameter between about 1 mm and about 30 mm or between about 5 mm and about 15 mm. An infill material, in some embodiments, comprises crushed silica sand particles, rubber granules, granulated coal slag, crushed flint, or crushed granite or combinations thereof. In some embodiments, an infill material comprises polyurethane and/or other polymeric materials. The size, shape, and/or composition of an infill material, in some embodiments, is selected according to one or more desired properties of the artificial turf mat. Desired properties, in some embodiments, include tear strength, weather resistance, abrasive wear resistance, dimensional stability, elasticity, and/or shock absorbency. In some embodiments, an infill material is selected according to its ability to assist one or more artificial turf fibers to stand erect.

As described herein, in some embodiments, at least one energy management material is disposed in an infill material of the artificial turf mat. An energy management material can be disposed in an infill material in any manner not inconsistent with the objectives of the present invention. In some embodiments, for example, an energy management material is disposed on a surface of the infill material. In some embodiments, an energy management material is disposed as a coating on the surface. In some embodiments, the coating comprises a laminate coating. In other embodiments, an energy management material is embedded within the infill material. In some embodiments, for example, an energy management material is dispersed uniformly or substantially uniformly in the infill material. Moreover, in some embodiments wherein an infill material comprises granules or beads, some granules or beads comprise an energy management material and some granules or beads do not comprise an energy management material.

Further, in some embodiments comprising at least one energy management material disposed in an infill material of an artificial turf mat described herein, the energy management material can be present in any amount not inconsistent with the objectives of the present invention. In some embodiments, the energy management material is present in the infill material in an amount up to about 90 weight percent. In some embodiments, the energy management material is present in the infill material in an amount up to about 85 weight percent or up to about 70 weight percent. In some embodiments, the energy management material is present in the infill material in an amount between about 1 weight percent and about 90 weight percent, between about 10 weight percent and about 70 weight percent, or between about 15 weight percent and about 50 weight percent. In some embodiments, the energy management material is present in the infill material in an amount between about 50 weight percent and about 90 weight percent.

Moreover, in some embodiments, the presence of an energy management material in the infill material does not substantially diminish the mechanical properties of the infill material. In some embodiments, for example, an energy management material is present in the infill material in an amount up to about 90 weight percent and the infill material has sufficient elasticity and/or shock absorbency to be used in athletic field covering applications.

B. Artificial Turf Fibers

Artificial turf systems described herein also comprise artificial turf fibers disposed on a surface of the artificial turf mat. Any artificial turf fiber not inconsistent with the objectives of the present invention may be used. In some embodiments, for example, an artificial turf fiber comprises one or more yarns. Any yarn not inconsistent with the objectives of the present invention may be used. For example, in some embodiments, a yarn comprises a number of fibers twisted together (e.g., a spun yarn); a number of filaments laid together without twist (e.g., a zero twist yarn); a number of filaments laid together with a degree of twist; a single filament with or without twist (e.g., a monofilament); a natural fiber; a manufactured fiber or filament; a mono-component, bi-component, tri-component, or multiple-component fiber or filament; a narrow strip of material, such as paper, plastic film, or metal foil, with or without twist, configured for use in a textile construction; or combinations thereof. Further, a mono-component, bi-component, tri-component, or multiple-component fiber or filament can comprise any one of a core-and-sheath configuration (including, e.g., a concentric, eccentric, bi-lobal, tri-lobal, tetra-lobal, or multi-lobal configuration); a side-by-side configuration (including, e.g., a mixed viscosity, bi-lobal, tri-lobal, tetra-lobal, or multi-lobal configuration); a tipped configuration (including, e.g., a bi-lobal, tri-lobal, tetra-lobal, multi-lobal, or cross configuration); a microdenier configuration (including, e.g., a segmented pie, islands-in-a-sea, or striped configuration); or combinations thereof.

Moreover, an artificial turf fiber described herein can have any composition not inconsistent with the objectives of the present invention. In some embodiments, for example, an artificial turf fiber comprises a polymer, including any one or more of a copolymer, elastomer, homopolymer, plastomer, plastomer blend, polymer alloy, polymer blend, thermoplastic. In some embodiments, an artificial turf fiber comprises polyethylene, polypropylene, polyamide, polyester (e.g., polyethylene terephthalate (PET) or polybutylene terephthalate (PBT)), or combinations or copolymers or blends thereof. Further, an artificial turf fiber can comprise a mono-, bi-, tri- or multi-component fiber comprising any one or more of polyethylene, polypropylene, polyamide, polyester, and copolymers and blends thereof. For example, in some embodiments, an artificial turf fiber comprises multiple types of polymer in a core-and-sheath configuration.

In addition, an artificial turf fiber described herein, in some embodiments, can represent one artificial blade of grass. Therefore, a plurality of artificial turf fibers, in some embodiments, can represent a plurality of artificial blades of grass. In some embodiments, a plurality of artificial turf fibers comprises artificial turf fibers having different characteristics, such as different sizes, shapes, and/or compositions. In other embodiments, a plurality of artificial turf fibers comprises identical or substantially identical artificial turf fibers.

Artificial turf fibers described herein can be disposed on a surface of the artificial fiber mat in any manner not inconsistent with the objectives of the present invention. In some embodiments, for example, the artificial turf fibers are woven through the artificial turf mat. In some embodiments, the artificial turf fibers are "tufted." In some embodiments, the artificial turf fibers are woven through the artificial turf mat to provide artificial turf fibers disposed at a surface of the mat.

As described herein, in some embodiments, at least one energy management material is disposed in artificial turf fibers. An energy management material can be disposed in any portion of an artificial turf fiber not inconsistent with the objectives of the present invention. In some embodiments, for example, at least one energy management material is disposed on a surface of an artificial turf fiber. An energy management material disposed on a surface of an artificial turf fiber can, in some instances, comprise a coating on the surface or a portion of the surface. A coating, in some embodiments, is a laminate coating. Further, a surface can comprise a side or an end of an artificial turf fiber. Alternatively, in some embodiments, at least one energy management material is disposed in the interior of an artificial turf fiber. In such embodiments, the at least one energy management material can be dispersed uniformly or substantially uniformly in the interior of the artificial turf fiber.

Further, an energy management material can be disposed in an artificial turf fiber using any method not inconsistent with the objectives of the present invention. For example, in some embodiments, an energy management material is applied to a surface of a fiber by spraying or rolling. In other embodiments, an energy management material is coextruded with a fiber or a portion of a fiber. Moreover, at least one energy management material can be present in artificial turf fibers in any amount not inconsistent with the objectives of the present invention. In addition, in some embodiments, the presence of the at least one energy management material does not substantially diminish the mechanical properties of the artificial turf fibers. For example, in some embodiments, artificial turf fibers comprising at least one energy management material described herein can have sufficient tear strength, weather resistance, abrasive wear resistance, dimensional stability, elasticity, and/or shock absorbency to be used in athletic field covering applications.

C. Drainage Layers

In some embodiments, an artificial turf system described herein further comprises one or more drainage layers, A drainage layer, in some embodiments, is disposed beneath an artificial turf mat described herein. In some embodiments, a drainage layer facilitates the drainage of water away from the artificial turf mat. Any drainage layer not inconsistent with the objectives of the present invention may be used. For instance, in some embodiments, a drainage layer comprises a geotextile.

D. Energy Management Materials

Artificial turf systems described herein comprise at least one energy management material. Any energy management material not inconsistent with the objectives of the present invention may be used. In some embodiments, for example, an energy management material comprises an energy absorbing material, a thermal insulation material, an energy reflecting material, or combinations thereof Therefore, in some embodiments, an energy management material is operable to reduce the amount of energy transferred to an artificial turf system described herein. In other embodiments, an energy management material is operable to increase the heat capacity of one or more components of an artificial turf system described herein. Therefore, in some embodiments, at least one energy management material disposed in one or more components of an artificial turf system is operable to maintain the temperature of the artificial turf system or the environment of the artificial turf system at a desired temperature or within a desired range of temperatures.

1. Energy Absorbing Materials

In some embodiments, an energy management material comprises an energy absorbing material. Any energy absorbing material not inconsistent with the objectives of the present invention may be used. In some embodiments, an energy absorbing material is operable to absorb electromagnetic radiation. The electromagnetic radiation, in some embodiments, comprises solar radiation, including infrared radiation. In other embodiments, an energy absorbing material is operable to absorb thermal energy from its environment. For instance, in some embodiments, an energy absorbing material is operable to absorb thermal energy using an adsorption and/or evaporation process. Therefore, in some embodiments, an energy absorbing material comprises a material having a high heat of adsorption and/or the ability to hydrate and dehydrate while maintaining structural stability.

In some embodiments, an energy absorbing material described herein comprises a zeolite. Any zeolite not inconsistent with the objectives of the present invention may be used. In some embodiments, a zeolite comprises a natural zeolite. In other embodiments, a zeolite comprises an artificial zeolite. In some embodiments, a zeolite comprises a silicate and/or aluminosilicate. In some embodiments, a zeolite comprises a composition according to the formula:

$$M_{x/n}[(AlO_2)_x(SiO_2)_y]\cdot wH_2O,$$

where n is the valence of cation M (e.g., $Na^+$, $K^+$, $Ca^{2+}$, or $Mg^{2+}$), w is the number of water molecules per unit cell, and x and y are the total number of tetrahedral atoms per unit cell. Non-limiting examples of zeolites suitable for use in some embodiments described herein include analcime ((K,Ca,Na)AlSi$_2$O$_6$.H$_2$O), chabazite ((Ca,Na$_2$,K$_2$,Mg)Al$_2$Si$_4$O$_{12}$.6H$_2$O), clinoptilolite ((Na,K,Ca)$_{2-3}$Al$_3$(Al,Si)$_2$Si$_{13}$O$_{36}$.12H$_2$O), heulandite ((Ca,Na)$_{2-3}$Al$_3$(Al,Si)$_2$Si$_{13}$O$_{36}$.12H$_2$O), natrolite ((Na$_2$Al$_2$Si$_3$O$_{10}$.2H$_2$O), phillipsite ((Ca,Na$_2$,K$_2$)$_3$Al$_6$Si$_{10}$O$_{32}$.12H$_2$O), and stilbite ((NaCa$_4$(Si$_{27}$Al$_9$)O$_{72}$.28(H$_2$O)).

In other embodiments, an energy absorbing material comprises a super absorbent polymer (SAP). Any SAP not inconsistent with the objectives of the present invention may be used. In some embodiments, for example, a SAP comprises poly(acrylic acid) and/or poly(sodium acrylate). In some embodiments, an energy absorbing material comprises one or more aerogels. An aerogel can be in hydrophobic form or hydrophilic form.

In other embodiments, an energy absorbing material can absorb energy using a phase transition. The phase transition can be any phase transition not inconsistent with the objectives of the present invention (including, for example, fusion, crystallization, eutectic melting, or other transitions between solid phases). In some embodiments, the phase transition does not involve a substantial volume change. Further, the phase transition can occur at any temperature and have any phase transition enthalpy not inconsistent with the objectives of the present invention.

Moreover, in some embodiments, an energy absorbing material that can absorb energy using a phase transition can also release energy using a phase transition. Therefore, in some embodiments, an energy absorbing material described herein comprises an energy modulating material. An energy modulating material, in some embodiments, is operable to both absorb energy and release energy, such as thermal energy. The ability to both absorb and release energy, in some embodiments, permits an energy modulating material described herein to provide cooling to an artificial turf system on warm days and heating to an artificial turf system on cold days. On cold days, for example, an energy modulating material described herein, in some embodiments, can absorb and store solar energy during sunlight hours and release thermal energy when ambient temperatures decrease at dusk and at night.

Therefore, in some embodiments, an energy absorbing material described herein comprises a phase change material. A phase change material can have any properties not inconsistent with the objectives of the present invention. For instance, in some embodiments, a phase change material is an energy modulating material. In some embodiments, a phase change material is substantially chemically inert or has limited chemical reactivity. In some embodiments, a phase change material has a phase transition temperature between about 10° C. and about 95° C. In some embodiments, a phase change material has a phase transition temperature between about 30° C. and about 95° C. In other embodiments, a phase change material has a phase transition temperature between about 30° C. and about 60° C.

Further, in some embodiments, a phase change material has a phase transition enthalpy of at least about 100 kJ/kg. In other embodiments, a phase change material has a phase transition enthalpy of at least about 150 kJ/kg or at least about 200 kJ/kg. In some embodiments, a phase change material has a phase transition enthalpy between about 100 kJ/kg and about 200 kJ/kg.

In addition, a phase change material can have any composition not inconsistent with the objectives of the present invention. In some embodiments, a phase change material comprises an inorganic composition. In some embodiments, a phase change material comprises an organic composition.

In some embodiments, a phase change material comprises a paraffin. In some embodiments, a phase change material comprises n-dodecane, n-tridecane, n-tetradecane, n-pentadecane, n-hexadecane, n-heptadecane, n-octadecane, n-nonadecane, n-eiscosane, n-heneicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In other embodiments, a phase change material comprises a fatty acid, salt hydrate, eutectic mixture, ester, alcohol, or glycol or combination thereof Suitable fatty acids for use as a phase change material in some embodiments described herein include myristic acid, palmitic acid, stearic acid, capric acid, caprylic acid, oleic acid, lauric acid, and/or mixtures thereof. Suitable fatty alcohols for use as a phase change material in some embodiments described herein include capryl alcohol, capric alcohol, lauryl alcohol, myristyl alcohol, cetyl alcohol, palmitoleyl alcohol, stearyl alcohol, isostearyl alcohol, oleyl alcohol, and cetearyl alcohol and/or mixtures thereof. In some embodiments, suitable salt hydrates include, without limitation $Ca(NO_3)_2 \cdot 3H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, and/or mixtures thereof.

In addition, in some embodiments, a phase change material comprise a polymeric material. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene).

Additional non-limiting examples of phase change materials suitable for use in some embodiments described herein include BioPCM-Q25, BioPCM-Q30, BioPCM-Q35, BioPCM-Q40, and BioPCM-Q45, all commercially available from QuarTek Corporation (High Point, N.C.).

Moreover, in some embodiments of energy absorbing materials comprising a phase change material, the energy absorbing material further comprises a non-phase change material. For example, in some embodiments, an energy absorbing material comprising a phase change material further comprises a nucleating agent. A nucleating agent, in some embodiments, can help avoid subcooling, particularly for phase change materials comprising finely distributed phases, such as fatty alcohols, paraffinic alcohols, amines, and paraffins.

As described herein, an energy absorbing material, such as a phase change material, can be disposed in one or more portions of an artificial turf system. The energy absorbing material can be disposed in one or more portions of the artificial turf system in any manner not inconsistent with the objectives of the present invention. In some embodiments, for example, an energy absorbing material is disposed in the form of microcapsules (as described, for example, in U.S. Pat. No. 6,703,127 to Davis et al. and U.S. Pat. No. 6,835,334 to Davis et al.) and/or macrocapsules (as described, for example, in U.S. Pat. No. 6,703,127 to Davis et al., U.S. Pat. No. 7,160,612 to Magill et al., U.S. Pat. No. 7,666,502 to Magill et al., and U.S. Pat. No. 7,666,500 to Magill et al.). An energy absorbing material, in some embodiments, can be encapsulated in microcapsules using conventional techniques for forming microcapsules, including interfacial polymerization, phase separation/coacervation, spray drying, spray coating, fluid bed coating, and supercritical anti-solvent precipitation.

Further, the microcapsules can have any size not inconsistent with the objectives of the present invention. In some embodiments, the size is selected based upon the portion of the artificial turf system in which the microcapsules are disposed, For instance, when microcapsules are disposed in a backing or binding agent of an artificial turf mat, the microcapsules can have an average size less than the thickness of the backing or binding agent, respectively. Alternatively, when the microcapsules are disposed in artificial turf fibers, the microcapsules can have an average size less than about one-half of the average diameter of the fibers. Therefore, in some embodiments, the microcapsules have an average size between about 1 µm and about 100 µm, between about 1 µm and about 30 µm, or between about 1 µm and about 10 µm. Moreover, when the microcapsules are disposed within particles of an infill material, the microcapsules can have an average size that is less than about one-half the average size of such particles. Therefore, in some embodiments, the microcapsules have an average size from about 0.1 mm to about 5.0 mm or from about 0.5 mm to about 2 mm. In other embodiments, the microcapsules have an average size between about 1 µm and about 100 µm or between about 2 µm and about 50 µm.

In addition, when a microcapsule is disposed within a particle of an infill material, the particle can comprise a single phase change material, a mixture of two or more phase change materials, or a mixture of one or more phase change materials with one or more non-phase change materials. Such an infill material may be prepared, in some embodiments, by initially preparing a porous particle of non-phase change material (e.g., a zeolite and/or aerogel) and subsequently immersing the porous particle in the liquid phase of a suitable phase change material to permit the phase change material to be drawn into the particle, for example, by osmotic forces.

Alternatively, particles of an infill material may be composed of an agglomeration of microcapsules containing one or more phase change materials, alone or with another material, such as one or more inert mineral materials. In the alternative, particles of an infill material may be formed from microcapsules containing one or more phase change materials and dispersed in a binder material, such as a urethane or siliceous binder material.

When one or more phase change materials are located outside of particles of an infill material, the particles may be coated with one or more layers. For example, the particles may be formed from an inert mineral material and coated with a layer of microcapsules including one or more phase change materials dispersed in a binder such as a urethane or siliceous material. A layer including the microcapsules may in turn be covered with an outer layer that does not contain one or more phase change materials but instead may contain any one of colorants, pigments, solar heat reflection pigments, antimicrobials, or combinations thereof. Some non-limiting examples of antimicrobial materials include silver based materials, copper based materials, zinc based materials, and mixtures thereof (e.g., copper-silver-zinc alloys, or copper-silver alloys, or silver-zinc alloys, cuprous oxide and/or zinc oxide, or mixtures thereof).

Moreover, in some embodiments, microcapsules described herein can themselves be encapsulated in macrocapsules. In turn, such macrocapsules may, in some embodiments, be agglomerated with inert material to form an infill material, which can be subsequently adsorbed on a finely divided solid microporous material such as amorphous silica or zeolites. In addition, in some embodiments comprising a phase change material packaged in microcapsules, a wall of a microcapsule can include an elastomeric polymer to permit expansion and contraction of the phase change material as it undergoes phase transitions. Alternatively, a phase change material can be packaged within the microcapsules with a sufficient void volume to accommodate a contemplated volume change accompanying a phase transition without rupture of the microcapsule walls. This might be accomplished, for example, by employing one or more volatile diluents for the phase change material. In this manner, a solution of a phase change material and the one or more diluents may be encapsulated. The one or more diluents may be selected for their high diffusivity in the composition constituting the microcapsule to facilitate the escape of the one or more diluents through the walls of the microcapsule after its formation.

2. Thermal Insulation Materials

In some embodiments, an energy management material comprises a thermal insulation material. Any thermal insulation material not inconsistent with the objectives of the present invention may be used. In some embodiments, a thermal insulation material comprises an aerogel. Any aerogel not inconsistent with the objectives of the present invention may be used. In some embodiments, an aerogel comprises one or more of silica gel, carbon gel, alumina, chromic, and tin oxide. In some embodiments, an aerogel is hydrophilic. In other embodiments, an aerogel is hydrophobic.

As described herein, a thermal insulation material, such as an aerogel, can be disposed in one or more portions of an artificial turf system. The thermal insulation material can be disposed in one or more portions of the artificial turf system in any manner not inconsistent with the objectives of the present invention. In some embodiments, for example, an aerogel is disposed on the surface of artificial turf fibers described herein.

3. Energy Reflecting Materials

In some embodiments, an energy management material comprises an energy reflecting material. Any energy reflecting material not inconsistent with the objectives of the present invention may be used. In some embodiments, an energy reflecting material is operable to reflect or partially reflect electromagnetic radiation. Reflecting electromagnetic radiation can reduce or eliminate radiative heat transfer to the reflecting material from its environment. In some embodiments, the reflected electromagnetic radiation comprises solar radiation or a portion of solar radiation. In some embodiments, for example, the reflected electromagnetic radiation comprises ultraviolet (UV) radiation, such as radiation having a wavelength between about 295 nm and about 400 nm. Therefore, in some embodiments, an energy reflecting material described herein is operable to reflect or partially reflect UV radiation. In other embodiments, the reflected electromagnetic radiation comprises visible radiation, such as radiation having a wavelength between about 400 nm and about 700 nm. In still other embodiments, the reflected electromagnetic radiation comprises infrared (IR) radiation, such as radiation having a wavelength between about 700 nm and about 2500 nm. Therefore, in some embodiments, an energy reflecting material described herein is operable to reflect or partially reflect IR radiation. In some embodiments, an energy reflecting material described herein is operable to reflect or partially reflect radiation having a wavelength between about 700 nm and about 1100 nm. Further, in some embodiments, an energy reflecting material has a reflectance maximum between about 700 nm and about 1100 nm. Moreover, in some embodiments, an energy reflecting material described herein is operable to reflect or partially reflect more than one type of radiation. In some embodiments, for example, an energy reflecting material is operable to reflect or partially reflect UV and IR radiation.

In addition, an energy reflecting material described herein can also exhibit other properties. For example, in some embodiments, an energy reflecting material exhibits excellent weatherability. In other embodiments, an energy reflecting material has a dark color. Dark colored energy reflecting materials, in some embodiments, provide dark coloration without the heat buildup associated with other dark colored materials that do not reflect infrared radiation.

In some embodiments, an energy reflecting material described herein comprises an inorganic composition. In some embodiments, for example, an energy reflecting material comprises a metal oxide. A metal oxide, in some embodiments, has the formula $M_xO_y$, where M is one or more metal ions (including, for example, one or more of Al, Co, Cr, Cu, Fe, Li, Mg, Mn, Ni, Si, Ti, V, and Zn), x is 1, 2, 3, 4 or fractions thereof, and y is 1, 2, 3, 4 or fractions thereof. In some embodiments, an energy reflecting material comprises a metal salt. A metal salt, in some embodiments, has the formula $M_vZ_w$, where M is one or more metal ions, v is 1, 2, or fractions thereof, Z is an ion comprising one or more of chloride, bromide, iodide, hydroxide, nitrate, acetate, sulfate, acetylacetonate or oxide, and w is 1, 2, 3, 4, or fractions thereof. In some embodiments, an energy reflecting material comprises the calcination product of a metal oxide described herein and a metal salt described herein. In some embodiments, an energy reflecting material comprises a spinel structure or rutile structure.

Moreover, in some embodiments, an energy reflecting material comprises a zeolite. Any zeolite not inconsistent with the objectives of the present invention may be used. In some embodiments, for example, a zeolite comprises any of the zeolites described hereinabove regarding energy absorbing materials.

In some embodiments, an energy reflecting material comprises a pigment. In some embodiments for example, an energy reflecting material comprises nickel manganese ferrite blacks (such as Pigment Black 30) and/or iron chromite brown-blacks (such as CI Pigment Green 17, CI Pigment Browns 29 and 35). In some embodiments, an energy reflecting material comprises Pigment Blue 28, Pigment Blue 36, Pigment Green 26, Pigment Green 50, Pigment Brown 33, Pigment Brown 24, Pigment Black 12 and Pigment Yellow 53. Other pigments are described, for example, in White, "Complex Inorganic Color Pigments: Durable Pigments for Demanding Applications," Paint Coat. Ind. 2000, 16(3), 54-56, the entirety of which is hereby incorporated by reference.

Additional non-limiting examples of energy reflecting materials suitable for use in some embodiments described herein are described in A. K. Bendiganavale et. al. "Infrared Reflective Inorganic Pigments," Recent Patents on Chemical Engineering, 2008, 1, 67-79; D. M. Hyde, "Infrared Reflective Pigmentation Technologies and the Future of Coatings, Part 1," PCI—Paint & Coatings Industry, BNP Media, posted Jul. 1, 2007 (http://www.pcimag.com/copyright/BNP_GUID_9-5-2006_A_10000000000000139213?view=print, accessed Oct. 25, 2010); D. M. Hyde, "Infrared Reflective Pigmentation Technologies and the Future of Coatings, Part 2: The Science Behind the Technology," PCI—Paint & Coatings Industry, BNP Media, posted Aug. 1, 2007 (http://www.pcimag.com/copyright/BNP_GUID_9-5-

2006_A_10000000000000154034?view=print, accessed Oct. 25, 2010); D. M. Hyde, "Infrared Reflective Pigmentation Technologies and the Future of Coatings, Part 3," PCI—Paint & Coatings Industry, BNP Media, posted Sep. 1, 2007 (http://www.pcimag.com/copyright/BNP_GUID_9-5-2006_A_10000000000000173927?view=print, accessed Oct. 25, 2010); M. Ryan, "Introduction to IR-Reflective Pigments," PCI—Paint & Coatings Industry, BNP Media, posted Aug. 1, 2005 (http://www.pcimag.com/copyright/cf5b599d3f6a7010VgnVCM1000001932a8c0_?view=print, accessed Oct. 25, 2010); J. P. White, "Complex Inorganic Color Pigments: Durable Pigments for Demanding Applications," PCI—Paint & Coatings Industry, BNP Media, posted Apr. 11, 2000 (http://www.pcimag.com/copyright/8396d3ab726a7010VgnVCM100000f932a8c0_?view=print, accessed Oct. 25, 2010); U.S. Pat. No. 7,641,959; U.S. Pat. No. 7,455,899; U.S. Pat. No. 7,241,500; U.S. Pat. No. 6,692,824; U.S. Pat. App. Pub. No. 2005/0072114; U.S. Pat. App. Pub. No, 2005/0072110; U.S. Pat. App. Pub. No. 2003/0152747; U.S. Pat. App. Pub. No. 2003/0148093; U.S. Pat. App. Pub. No. 2003/0091814; and U.S. Pat. App. Pub. No. 2003/0031850, each of which is incorporated herein by reference in its entirety.

As described herein, an energy reflecting material can be disposed in one or more portions of an artificial turf system. The energy reflecting material can be disposed in one or more portions of the artificial turf system in any manner not inconsistent with the objectives of the present invention. In some embodiments, for example, an energy reflecting material is disposed on the surface of artificial turf fibers described herein.

4. Placement of Energy Management Materials

As described hereinabove, an energy management material can be disposed in various portions of various components of an artificial turf system. For example, in some embodiments, an energy management material is disposed in a backing of the artificial turf mat, a binding agent of the artificial turf mat, and/or an infill material of the artificial turf mat. Moreover, in some embodiments, an energy management material is disposed on a surface or in the interior of artificial turf fibers.

In addition, it is to be understood that, in some embodiments, one or more energy management materials can be disposed in one or more locations of an artificial turf system described herein independently of the placement of one or more other energy management materials in the system. Therefore, in some embodiments, any energy management material described herein can be disposed in any portion of an artificial turf system described herein, alone or in conjunction with any other number of energy management materials described herein.

For example, in some embodiments, an artificial turf mat comprises at least one first energy management material and artificial turf fibers comprise at least one second energy management material. Moreover, the artificial turf mat can comprise one or more first energy management materials in one or more different components of the artificial turf mat or portions of such components. Further, the one or more first energy management materials disposed in various components can comprise the same or different types of energy management material. Similarly, the artificial turf fibers can comprise one or more second energy management materials in one or more different components of the artificial turf fibers or portions of such components. Further, the one or more second energy management materials disposed in various components can comprise the same or different types of energy management material.

For instance, in some embodiments, an artificial turf system described herein comprises an energy reflecting material and a thermal insulation material disposed on artificial turf fibers and an energy absorbing material disposed in a backing of the artificial turf mat. In some embodiments, an infill material of the artificial turf mat also comprises an energy absorbing material and/or an energy reflecting material.

II. Methods of Maintaining the Temperature of an Artificial Turf Environment

In another aspect, methods of maintaining the temperature of an artificial turf environment are described herein. In some embodiments, a method of maintaining the temperature of an artificial turf environment comprises providing any artificial turf system described hereinabove in Section I. For example, in some embodiments, a method of maintaining the temperature of an artificial turf environment comprises providing an artificial turf system comprising an artificial turf mat and artificial turf fibers disposed on a surface of the artificial turf mat, the artificial turf mat comprising at least one energy management material. Providing an artificial turf system described herein, in some embodiments, reduces the heat buildup on or near an artificial turf by reducing heat buildup from one or more heating pathways and/or by providing one or more heat sinks. For instance, in some embodiments, an energy reflecting material of an artificial turf system described herein reduces heat buildup from radiative heat transfer from the sun or other source of electromagnetic radiation. In other embodiments, an energy absorbing material of an artificial turf system described herein reduces heat buildup by providing a heat sink.

In addition, in some embodiments, providing an artificial turf system described herein reduces the heat buildup on or near an artificial turf by providing one or more cooling pathways. For example, in some embodiments, an energy absorbing material of an artificial turf system described herein reduces heat buildup by adsorption cooling.

The reduction of heat buildup from one or more heating pathways and/or the provision of one or more cooling pathways, in some embodiments, allows the temperature of an artificial turf environment or a portion thereof to be maintained at a temperature closer to the ambient temperature than otherwise possible. In some embodiments of methods described herein, for instance, maintaining the temperature of an artificial turf environment comprises maintaining the temperature of the air immediately above the artificial turf system within about ±15° C. of the ambient temperature. In other embodiments, maintaining the temperature of the artificial turf environment comprises maintaining the temperature of the air immediately above the artificial turf system within about ±10° C. of the ambient temperature or within about ±5° C. of the ambient temperature.

Alternatively, in other embodiments, maintaining the temperature of an artificial turf environment comprises maintaining the temperature of the surface of the artificial turf mat within about ±15° C. of the ambient temperature. In some embodiments, maintaining the temperature of the artificial turf environment comprises maintaining the temperature of the surface of the artificial turf mat within about ±10° C. of the ambient temperature or within about ±5° C. of the ambient temperature.

In some embodiments of methods described herein comprising maintaining the temperature of an artificial turf environment within a certain range of the ambient temperature, the ambient temperature is greater than about 30° C. In other embodiments, the ambient temperature is greater than about 35° C. In some embodiments, the ambient temperature is between about 30° C. and about 45° C. or between about 35° C. and about 45° C. The ambient temperature, in some embodiments, refers to the average temperature of the surroundings of the artificial turf environment, such as the temperature registered by an outdoor thermometer in embodiments comprising an outdoor artificial turf environment. Alternatively, in other embodiments, the ambient temperature refers to the temperature of natural turf under similar conditions (including, e.g., illumination and average temperature of the surroundings).

In other embodiments of methods described herein, maintaining the temperature of an artificial turf environment comprises maintaining the temperature of the surface of the artificial turf mat below about 40° C. In other embodiments, maintaining the temperature of the artificial turf environment comprises maintaining the temperature of the surface of the artificial turf mat between about 33° C. and about 37° C.

III. Methods of Making an Artificial Turf System

In another aspect, methods of making an artificial turf system are described herein. In some embodiments, a method of making an artificial turf system comprises providing an artificial turf mat and disposing artificial turf fibers on a surface of the artificial turf mat, the artificial turf mat comprising at least one energy management material.

Turning now to specific steps of methods of making an artificial turf system described herein, methods of making an artificial turf system described herein comprise providing an artificial turf mat. Any artificial turf mat not inconsistent with the objectives of the present invention may be used. In some embodiments, the artificial turf mat comprises any artificial turf mat described hereinabove in Section I.

Methods of making an artificial turf system described herein also comprise disposing artificial turf fibers on a surface of the artificial turf mat. Any artificial turf fibers not inconsistent with the objectives of the present invention can be used. In some embodiments, for example, the artificial turf fibers comprise any of the artificial turf fibers described hereinabove in Section I.

Moreover, the artificial turf fibers can be disposed on a surface of the mat in any manner not inconsistent with the objectives of the present invention. In some embodiments, disposing the artificial turf fibers on a surface of the mat comprises "tufting." Tufting can be carried out in any manner not inconsistent with the objectives of the present invention. In some embodiments, for instance, tufting comprises a two step process whereby a previously produced fabric described herein (such as a flat woven fabric) is fed into a tufting machine as a substrate. Artificial turf fibers described herein are then tufted into the substrate in a three-dimensional arrangement whereby the fibers on the top of the substrate simulate natural grass blades.

In other embodiments, disposing the artificial turf fibers on a surface of the mat comprises knitting or weaving. Knitting or weaving can be carried out in any manner not inconsistent with the objectives of the present invention. In some embodiments, for example, knitting or weaving is a one step process.

Some embodiments described herein are further illustrated in the following non-limiting examples.

EXAMPLE 1

Backing with 30% PCM

A backing of an artificial turf mat described herein was made as follows. First, 34 kg polyol (Bayer Chemicals) and 30 kg phase change material (BioPCM-Q40, QuarTek Corporation) were added to a 100 gallon tank equipped with a mixer and heated at 40° C. Next, after 15 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 10 minutes. Then the contents of the tank were poured onto a conveyer belt with rollers to obtain the desired thickness of the backing sheet.

EXAMPLE 2

Backing with 30% Zeolites

A backing of an artificial turf mat described herein was made as follows. First, 34 kg polyol (Bayer Chemicals) and 30 kg natural zeolites (BRZ zeolites, Bear River Zeolites) were added to a 100 gallon tank equipped with a mixer and heated at 40° C. Next, after 15 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 10 minutes. Then the contents of the tank were poured onto a conveyer belt with rollers to obtain the desired thickness of the backing sheet.

EXAMPLE 3

Backing with 10% Aerogel

A backing of an artificial turf mat described herein was made as follows. First, 44 kg polyol (Bayer Chemicals) and 10 kg aerogel (Lumira Aerogel, Cabot Corporation) were added to a 100 gallon tank equipped with a mixer and heated at 40° C. Next, after 15 minutes of mixing, 2 kg polyurethane catalyst (DABCO T-12 Catalyst, Air Products) was added gradually, followed by the slow addition of 44 kg of methylene diphenyl diisocyanate (Huntsman Corporation). Mixing was continued for another 10 minutes. Then the contents of the tank were poured onto a conveyer belt with rollers to obtain the desired thickness of the backing sheet.

EXAMPLE 4

Backing with 15% PCM and 15% Zeolites

A backing of an artificial turf mat described herein was made as follows. First, 34 kg polyol (Bayer Chemicals) and 15 kg PCM (BioPCM-Q40, QuarTek Corporation) were added to a 100 gallon tank equipped with a mixer and heated at 40° C. Next, 15 kg natural zeolites (BRZ zeolites, Bear River Zeolites) was added to the tank while mixing. After 30 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 10 minutes. Then the contents of the tank were poured onto a conveyer belt with rollers to obtain the desired thickness of the backing sheet.

EXAMPLE 5

Backing with 15% PCM 10% Zeolites, and 5% Aerogel

A backing of an artificial turf mat described herein was made as follows. First, 34 kg polyol (Bayer Chemicals) and 15 kg PCM (BioPCM-Q40, QuarTek Corporation) were added to a 100 gallon tank equipped with a mixer and heated at 40° C. Next, 10 kg natural zeolites (BRZ zeolites, Bear River Zeolites) was added to the tank while mixing. After 10 minutes of mixing, 5 kg aerogel (Lumira Aerogel, Cabot Corporation) was added. Then, after another 10 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 10 minutes. Then the contents of the tank were poured onto a conveyer belt with rollers to obtain the desired thickness of the backing sheet.

EXAMPLE 6

Infill Material with 30% PCM

An infill material of an artificial turf mat described herein was made as follows. First, 34 kg polyol (Bayer Chemicals) and 30 kg PCM (BioPCM-Q40, QuarTek Corporation) were added to a 100 gallon tank equipped with a mixer and heated at 40° C. Next, 2 L water was added to the tank while mixing. After 10 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 5 minutes. Then the contents of the tank were poured onto a conveyer belt with a grid on top to make small blocks in different shapes. Rollers were used to push the contents of the tank into the grid to obtain individual particles having different sizes and shapes.

EXAMPLE 7

Infill Material with 10% Aerogel

An infill material of an artificial turf mat described herein was made as follows. First, 34 kg polyol (Bayer Chemicals) and 10 kg aerogel (Lumira Aerogel, Cabot Corporation) were added to a 100 gallon tank equipped with a mixer and heated at 40° C. Next, after 10 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 5 minutes. Then the contents of the tank were poured onto a conveyer belt with a grid on top to make small blocks in different shapes. Rollers were used to push the contents of the tank into the grid to obtain individual particles having different sizes and shapes.

EXAMPLE 8

Infill Material with 30% Zeolites

An infill material of an artificial turf mat described herein was made as follows. First, 34 kg polyol (Bayer Chemicals) and 30 kg natural zeolites (BRZ zeolites, Bear River Zeolites) were added to a 100 gallon tank equipped with a mixer and heated at 40° C. Next, 2 L water was added to the tank while mixing. After 10 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 5 minutes. Then the contents of the tank were poured onto a conveyer belt with a grid on top to make small blocks in different shapes. Rollers were used to push the contents of the tank into the grid to obtain individual particles having different sizes and shapes.

EXAMPLE 9

Infill Material with 15% PCM and 15% Zeolites

An infill material of an artificial turf mat described herein was made as follows. First, 34 kg polyol (Bayer Chemicals) and 15 kg PCM (BioPCM-Q40, QuarTek Corporation) were added to a 100 gallon tank equipped with a mixer and heated at 40° C. Next, 15 kg natural zeolites (BRZ zeolites, Bear River Zeolites) was added to the tank while mixing. Then 2 L water was added. After 10 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 5 minutes. Then the contents of the tank were poured onto a conveyer belt with a grid on top to make small blocks in different shapes. Rollers were used to push the contents of the tank into the grid to obtain individual particles having different sizes and shapes.

EXAMPLE 10

Infill Material with 15% PCM 10% Zeolites, and 5% Aerogel

An infill material of an artificial turf mat described herein was made as follows. First, 34 kg polyol (Bayer Chemicals) and 15 kg PCM (BioPCM-Q40, QuarTek Corporation) were added to a 100 gallon tank equipped with a mixer and heated at 40° C. Next, 10 kg natural zeolites (BRZ zeolites, Bear River Zeolites) was added to the tank while mixing. Then 2 L water was added. After 10 minutes of mixing, 5 kg aerogel (Lumira Aerogel, Cabot Corporation) was added. Then, after another 10 minutes of mixing, 2 kg polyurethane catalyst (DABCO T-12 Catalyst, Air Products) was added gradually, followed by the slow addition of 34 kg of methylene diphenyl diisocyanate (Huntsman Corporation). Mixing was continued for another 5 minutes. Then the contents of the tank were poured onto a conveyer belt with a grid on top to make small blocks in different shapes. Rollers were used to push the contents of the tank into the grid to obtain individual particles having different sizes and shapes.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:
1. An artificial turf system comprising:
an artificial turf mat; and
artificial turf fibers disposed on a surface of the artificial turf mat, the artificial turf mat comprising at least one first energy management material and the artificial turf fibers comprising at least one second energy management material,
wherein the at least one first energy management material comprises a phase change material,
wherein the at least one first energy management material is dispersed in a binding agent of the artificial turf mat, wherein the at least one second energy management material comprises a thermal insulation material, wherein the thermal insulation material comprises an aerogel, and wherein the at least one second energy management material is applied as a coating on a surface of the artificial turf fibers by spraying or rolling.

2. The system of claim 1, wherein the phase change material has a phase transition enthalpy between about 100 kJ/kg and about 200 kJ/kg.

3. The system of claim 1, wherein the phase change material has a phase transition enthalpy of at least 200 kJ/kg.

4. The system of claim 1, wherein the at least one second energy management material further comprises a zeolite.

5. The system of claim 1, wherein the at least one second energy management material further comprises an energy reflecting material.

6. A method of maintaining the temperature of an artificial turf environment comprising providing an artificial turf system comprising:

an artificial turf mat; and artificial turf fibers disposed on a surface of the artificial turf mat, the artificial turf mat comprising at least one first energy management material and the artificial turf fibers comprising at least one second energy management material, wherein the at least one first energy management material comprises a phase change material, wherein the at least one first energy management material is dispersed in a binding agent of the artificial turf mat, wherein the at least one second energy management material comprises a thermal insulation material, wherein the thermal insulation material comprises an aerogel, and wherein the at least one second energy management material is applied as a coating on a surface of the artificial turf fibers by spraying or rolling.

7. The method of claim 6, wherein maintaining the temperature of the artificial turf environment comprises maintaining the temperature of the air immediately above the artificial turf system within about ±10° C. of the ambient temperature.

8. The method of claim 6, wherein maintaining the temperature of the artificial turf environment comprises maintaining the temperature of the surface of the artificial turf mat within about ±5° C. of the ambient temperature.

9. The method of claim 8, wherein the ambient temperature is greater than about 30° C.

* * * * *